(12) United States Patent
Boesen (10) Patent No.: US 6,542,721 B2
(45) Date of Patent: Apr. 1, 2003

(54) CELLULAR TELEPHONE, PERSONAL DIGITAL ASSISTANT AND PAGER UNIT

(76) Inventor: Peter V. Boesen, 1000 73rd St., Suite 18, Des Moines, IA (US) 50311

( * ) Notice: Subject to any disclaimer, the term of this patent is extended or adjusted under 35 U.S.C. 154(b) by 0 days.

(21) Appl. No.: 09/846,789

(22) Filed: May 1, 2001

(65) Prior Publication Data

US 2001/0027121 A1 Oct. 4, 2001

Related U.S. Application Data

(63) Continuation-in-part of application No. 09/587,743, filed on Jun. 5, 2000, now Pat. No. 6,408,081, which is a continuation-in-part of application No. 09/416,168, filed on Oct. 11, 1999.

(51) Int. Cl.[7] .................................................. H04Q 7/32
(52) U.S. Cl. .......................................... 455/90; 455/550
(58) Field of Search ................................. 455/556, 566, 455/90, 550, 557

(56) References Cited

U.S. PATENT DOCUMENTS 5,151,946 A * 9/1992 Martensson ................... 379/38
5,189,632 A * 2/1993 Paajanen ................ 364/705.05

(List continued on next page.)

FOREIGN PATENT DOCUMENTS

| EP | 0776140 A1 | 5/1997 |
|---|---|---|
| EP | 0873031 A1 | 10/1998 |
| JP | 00022670 A | 1/2000 |
| JP | 10187797 | 1/2000 |
| WO | WO 00/49731 | 8/2000 |
| WO | WO 00/69151 | 11/2000 |
| WO | WO 01/13204 A1 | 2/2001 |
| WO | WO 01/13222 A3 | 2/2001 |
| WO | WO 01/13222 A2 | 2/2001 |
| WO | WO 01/13605 A2 | 2/2001 |
| WO | WO 01/13605 A3 | 2/2001 |
| WO | WO 01/77786 A2 | 10/2001 |
| WO | WO 01/77786 A3 | 10/2001 |
| WO | WO 01/77817 A1 | 10/2001 |

OTHER PUBLICATIONS

Article entitled, "Your Next Cellphone," by Suzanne Kantra Kirschner, pp. 55–58, Popular Science, Apr. 2001.

(List continued on next page.)

Primary Examiner—Daniel Hunter
Assistant Examiner—Nick Corsaro
(74) Attorney, Agent, or Firm—McKee, Voorhees & Sease, P.L.C.

(57) ABSTRACT

The handheld personal electronic device has a first body having a display, a second body having a plurality of manual inputs, the second body capable of attachment to the first body, the personal electronic device having an open position wherein the display of the first body and the manual inputs of the second body are accessibly exposed. And, the personal electronic device having a closed position wherein the display of the first body is protected by the second body and the manual inputs of the second body are accessibly exposed.

50 Claims, 10 Drawing Sheets

U.S. PATENT DOCUMENTS

| | | | |
|---|---|---|---|
| 5,497,339 A | | 3/1996 | Bernard |
| 5,584,054 A | * | 12/1996 | Tyneski .................... 455/89 |
| 5,606,594 A | | 2/1997 | Register et al. |
| 5,625,673 A | | 4/1997 | Grewe et al. |
| 5,657,370 A | * | 8/1997 | Tsugane .................... 455/550 |
| 5,659,620 A | | 8/1997 | Kuhlman |
| 5,675,524 A | | 10/1997 | Bernard |
| 5,715,524 A | * | 2/1998 | Jambhekar ................. 455/90 |
| 5,749,072 A | | 5/1998 | Mazurkiewicz et al. |
| 5,797,089 A | | 8/1998 | Nguyen |
| 5,894,595 A | | 4/1999 | Foladare et al. |
| 5,929,774 A | | 7/1999 | Charlton |
| 5,933,783 A | * | 8/1999 | Kawakami ................. 455/550 |
| 5,983,073 A | | 11/1999 | Ditzik |
| 5,987,146 A | | 11/1999 | Pluvinage et al. |
| 6,002,946 A | * | 12/1999 | Reber ........................ 455/557 |
| 6,021,207 A | | 2/2000 | Puthuff et al. |
| 6,047,196 A | | 4/2000 | Makela et al. |
| 6,094,492 A | | 7/2000 | Boesen |
| 6,112,103 A | | 8/2000 | Puthuff |
| 6,128,475 A | * | 10/2000 | Wicks ........................ 455/90 |
| 6,164,531 A | * | 12/2000 | Harris ........................ 235/380 |
| 6,181,801 B1 | | 1/2001 | Puthuff |
| 6,240,302 B1 | * | 5/2001 | Harrison .................... 455/556 |
| 6,243,595 B1 | * | 6/2001 | Lee ............................ 455/566 |
| 6,272,227 B1 | * | 8/2001 | Yanagisawa ............... 381/104 |
| 6,308,074 B1 | * | 10/2001 | Chandra .................... 455/462 |
| 6,370,362 B1 | | 4/2002 | Hansen et al. |
| 6,442,637 B1 | | 8/2002 | Hawkins et al. |

OTHER PUBLICATIONS

Article entitled, "Wireless Future Sizzles," by Keith Darce, The Times–Picayne, Sep. 26, 1999.

Article entitled, "5th International Conference on Wearable Computing" by Rick Johnson, Pen Computing Magazine, Aug. 2000.

Article entitled Handhelds That do It All, by Larry Armstrong, Business Week, Feb. 12, 2001.

* cited by examiner

CELLULAR TELEPHONE, PERSONAL DIGITAL ASSISTANT AND PAGER UNIT

CROSS-REFERENCE TO RELATED APPLICATIONS

This application is a continuation-in part to related co-pending applications: U.S. application Ser. No. 09/587,743 filed on Jun. 5, 2000, now U.S. Pat. No. 6,408,081; and U.S. application Ser. No. 09/416,168 filed on Oct. 11, 1999;

BACKGROUND OF THE INVENTION

1. Field of the Invention

The present invention relates to personal communications systems, including, but not limited to cellular telephones, personal digital assistants, pagers, and internet appliances.

2. Problems in the Art

The present invention relates to personal electronic devices and personal communication systems and many problems associated with such devices. One of the most recognized problems relates to hands-free communication. In voice communication systems, such as cellular telephones, it is more convenient and safer for voice communications to occur without requiring the use of hands. Many attempts have been made at solving this problem, resulting in cords running between headsets and cellular telephones, heavy and bulky headset units, and related problematic solutions. Another problem concerning personal electronic devices and personal communication systems is the increasing complexity of such devices. As technology improves, additional functionality has been given to cellular telephones, personal digital assistants, pagers, internet appliances, and other personal electronic devices. Increasing the complexity of the device generally involves increasing the number of buttons or controls associated with the device or otherwise making a device more hands intensive in operation.

Thus there is an even more pronounced problem when additional functionality is given to a personal digital assistant, cellular telephone, or related personal electronic device when that personal electronic device has been designed to provide additional functionality. The number of controls is increasingly providing greater difficulties in operating the device and there are greater difficulties in accessing the controls or buttons on the device. This is particularly true where some of the controls, such as a touch screen are protected.

Therefore, it is a primary objective, feature, or advantage of the present invention to provide an apparatus, and system which improve upon the state of the art.

It is another objective, feature, or advantage of the present invention to provide a system and apparatus of personal communication.

It is another objective, feature, or advantage of the present invention to provide a system and apparatus of hands-free communication.

It is a further objective, feature, or advantage of the present invention to provide a system and apparatus having accessible access to user controls.

It is a further objective, feature or advantage of the present invention to provide a system and apparatus that provides simplified access to a touch screen display.

It is a further objective, feature, or advantage of the present invention to provide a personal electronic device that includes a cellular transceiver and a personal digital assistant.

It is another objective, feature, or advantage of the present invention to provide a system and apparatus that includes a cellular transceiver, a personal digital assistant, and a pager.

It is a further objective, feature, or advantage of the present invention to provide a personal electronic device with a telephone keypad and a touch screen display, the telephone keypad and the touch screen display being simultaneously accessible.

These and other objectives, features, or advantages of the present invention will become apparent from the specification and claims.

BRIEF SUMMARY OF THE INVENTION

One aspect of the present invention relates to the physical configuration of a personal electronic device. The personal electronic device has a first body and a second body. In addition, there is means for connecting the first body to the second body. There is means for slidably moving the first body with respect to the second body and means for pivotally moving the first body with respect to the second body. This configuration of the present invention provides advantages over flip open-type devices. For example, when the first body has a display and the second body has a keypad, when in a closed position the personal electronic device allows the user access to the buttons on the keypad. In an open position the user has access to both the keypad as well as the display such as a touch-screen display.

Another aspect of the present invention is a system which includes the personal electronic device of the present invention in addition to an earpiece worn by the user. The earpiece may communicate with the personal electronic device through a short-range transceiver. The earpiece may include a bone conduction sensor and an air conduction sensor.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The present invention will be described as it applies to its preferred embodiment. It is not intended that the present invention be limited to the described embodiment. It is intended that the invention cover all modifications and alternatives which may be included within the spirit and scope of the invention.

Figure 1:
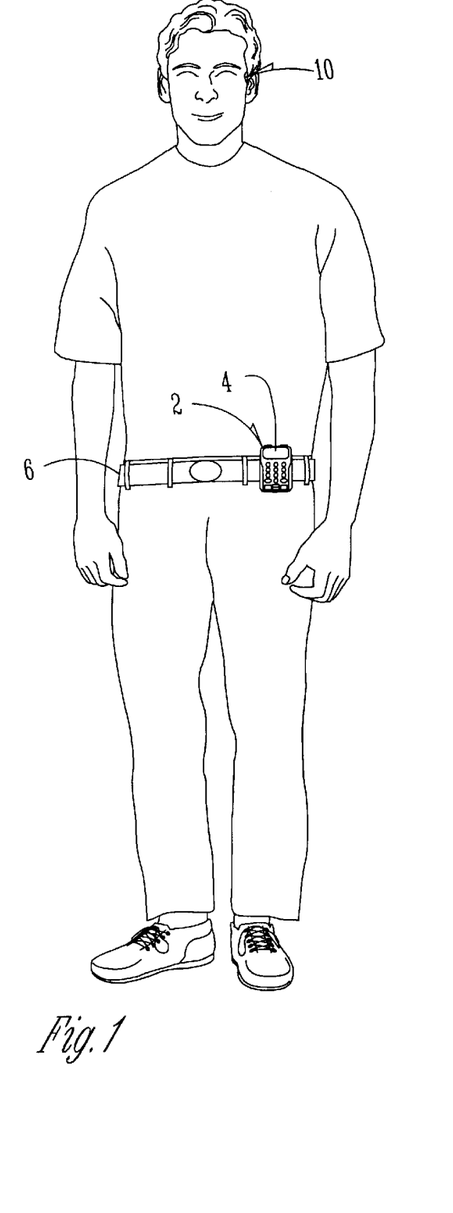
FIG. 1 is a diagram of a personal electronic device worn by a person according to the present invention.

FIG. 1 shows the personal electronic device 2 of the present invention as worn by a person. The personal electronic device as shown has a display 4 such as in a standard telephone transceiver. The device may be worn on a belt 6 as shown or may be placed in a pocket or may be carried by the person. Another addition to the system includes the earpiece 10 worn by the person.

Figure 2:
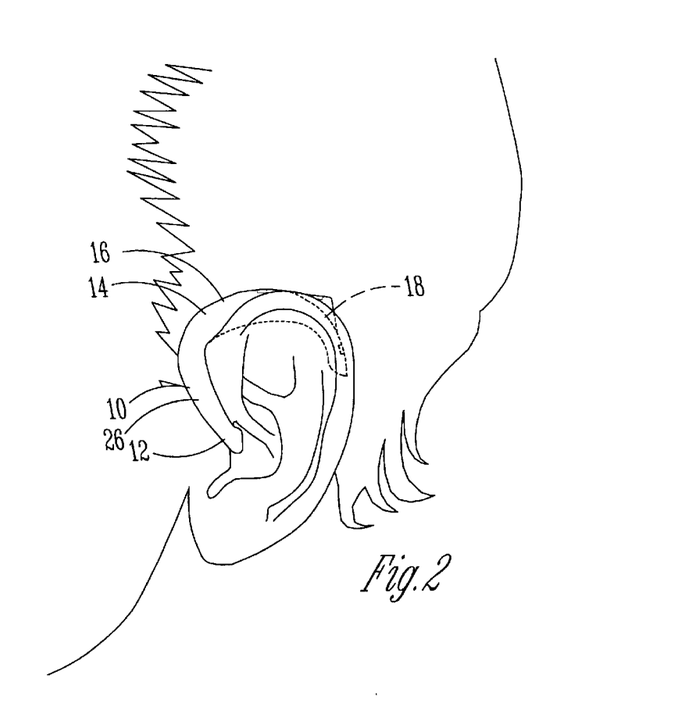
FIG. 2 is a representation of the earpiece of the present invention fitted on the ear.

FIG. 2 shows a pictorial representation of the earpiece 10 as worn in a person's ear. The earpiece has an external ear canal portion 12 which is fitted within the ear. The earpiece 10 has an ear attachment portion 14 fitted around the ear. The earpiece 10 in its preferred form houses a processor 16 and a transceiver 18.

Figure 3:
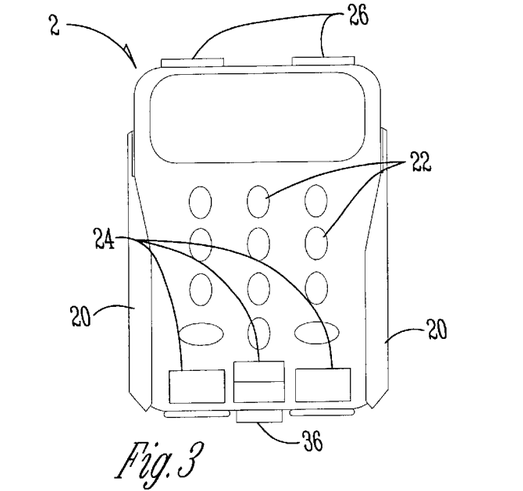
FIG. 3 is a diagram of the layout for the personal electronic device of the present invention in a closed position.

FIG. 3 is a diagrammatic representation of one embodiment of the personal electronic device 2 of the present invention. In FIG. 3, the personal electronic device 2 has a clip 20. The clip is used to attach the personal electronic device to a belt or pocket. The personal electronic device 2 also has a keypad 22. The keypad 22 may be a standard 12 key keypad such as typically used on telephones and cellular telephones. The present invention contemplates that additional function buttons 24 or other inputs may be used to provide additional functionality to the personal electronic device 2. The personal electronic device 2 may have a hinge 26. The hinge 26 permits the personal electronic device 2 to open. The opening of the personal electronic device 2 may be facilitated by an open button 36. The open button may be spring loaded or may be otherwise constructed to cause the personal electronic device 2 to open upon depression and/or release of open button 36.

It is to be further appreciated that the open button need not be mechanically connected to the hinge. The open button may simply be a button causing a digital signal change when pressed and/or released. The personal electronic device monitors the button's digital signal and when the open button signal changes an actuator is activated that opens the personal electronic device. The present invention contemplates this and other variations whereby a user can conveniently open the personal electronic device through use of a switch, button, latch, hook, or other physical means that is operated manually by a user or through voice activation or other electronic control.

Figure 4:
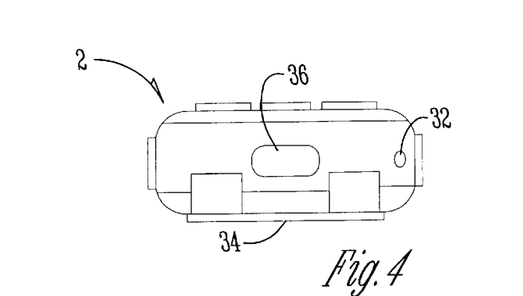
FIG. 4 is a view of the personal electronic device of the present invention in a closed position.

FIG. 4 shows a view of the bottom of the personal electronic device 2. The personal electronic device 2 may include an access port 32 and/or a vibration module 34. The access port 32 is used to provide additional functionality and communication capability. The access port may be a serial interface port such as for RS232 serial or USB. The access port may be an ethernet port, a firewire port, an infrared port conforming to the IrDA standard or other infrared standard. Wireless interfaces such as Bluetooth may also be used to provide access. The present invention contemplates that other types of interfaces may be used as may be known in the art.

The vibration module 34 is used to add tactile alert functionality to a personal electronic device 2. The vibration module 34 may contain one or more vibration motors. Preferably, the vibration motor is both small and low power. The personal electronic device 2 can be used as a pager or as a telephone, and when incoming calls or notifications are received, the vibration module can vibrate to alert the user of the message. The present invention also contemplates that the vibration module 34 can be used to alert the user of electronic messages or other events such as may be useful or desirable for the user to immediately be made aware of. For example, the vibration module may be activated by software executing on the PDA portion 28 of the device. Thus alarms may be set for any purpose including notifying a person of appointments, other reminders, incoming messages, or other reasons that may be useful or otherwise desirable.

Figure 5:
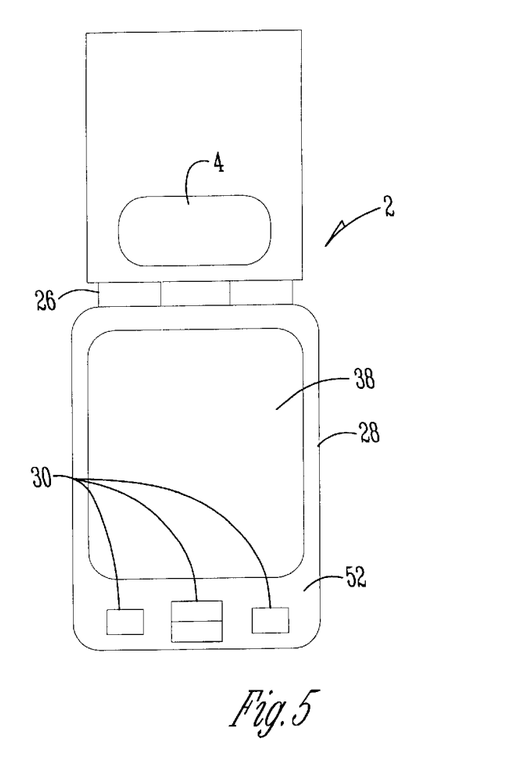
FIG. 5 is a top view of the personal electronic device of the present invention in an open position.

FIG. 5 shows one embodiment of the personal electronic device 2 of the present invention in an open position. One or more hinges 26 are opened to provide access to the PDA portion 28 of the personal electronic device 2. The term PDA is defined as a hand-held computer. The PDA portion 28 may include a touch screen 38 as well as additional PDA buttons 30 to add more functionality to the personal electronic device 2. The personal electronic device 2 may also have a transceiver 52 available. The use of transceiver 52 will be further explained in the context of the invention.

The PDA portion 28 may be an embedded computer or other device. For example, the PDA 28 may run Microsoft Windows, Microsoft Windows CE, the Palm OS, or other operating systems. The present invention is in no way limited by the type of processor used in the PDA, the operating system used by the PDA, or other variations. The PDA may be used for sending e-mail, taking notes, organizing one's schedule, web browsing, performing calculations, or any other function associated with a PDA or a computer. The PDA may include handwriting recognition functionality as may be known in the art. Examples of handwriting recognition software for Windows CE include ParaGraph's CALLIGRAPHER handwriting recognizer and Microsoft's TRANSCRIBER software. The PDA may also include specialized software. For example, when the PDA runs Windows CE, the software applications may be written in Microsoft Visual C++ or Microsoft Visual Basic or with any other computer language or software development tool. When the earpiece includes a bone conduction sensor, air conduction sensor, and a stereo transceiver, and the personal electronic device 2 includes a stereo transceiver as well, the PDA can be programmed to receive the stereo signals and perform processing to improve the speech signal. In addition, the PDA may also include voice recognition software so that when voice information is received, whether it be stereo or mono audio signals, the voice information may be used to control the PDA, control the telephone transceiver for voice to text applications, or other purposes. In addition, the voice software found on the PDA may be used in conjunction with audio received over the telephone transceiver. One example of voice recognition software available for Windows CE is ARTRECOGNITION from Advanced Recognition Technologies, Inc.

Figure 6:
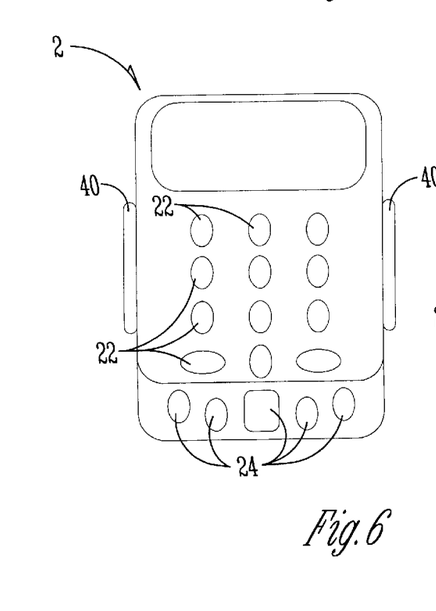
FIG. 6 is a top view of the personal electronic device of the present invention in a closed position.

FIG. 6 shows another embodiment of personal electronic device 2. In FIG. 6 the telephone transceiver portion of the personal electronic device 2 has a keypad 22 and also additional function buttons 24 available. Use of the term "telephone transceiver" should be construed broadly as to include radio telephones, cellular telephones, satellite telephones, and other types of voice communications devices. The function buttons 24 may be for use with the PDA. The cellular transceiver portion of the personal electronic device fits over the PDA portion of the device. A release button 40 may be used to cause the personal electronic device 2 to open. The release buttons 40 may be located on the side of the personal electronic device 2.

Figure 7:
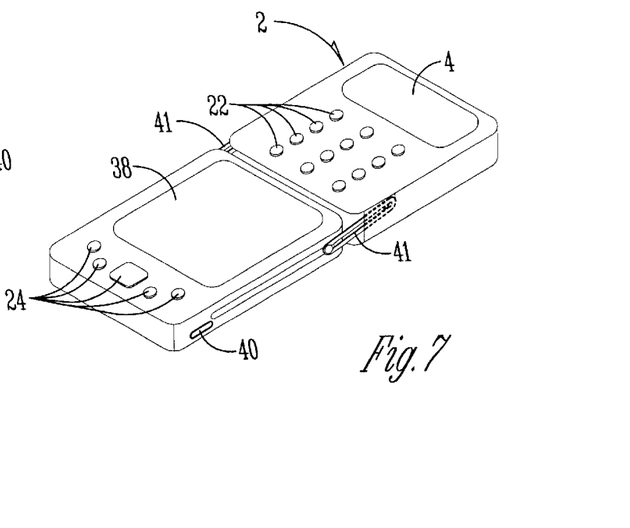
FIG. 7 is a diagram of the personal electronic device with a slide hinge.

FIG. 7 shows the personal electronic device 2 in an open position. The personal electronic device 2 opens in a manner such that both the PDA portion of the device and the cellular transceiver portion of the device are both accessible at the same time. The present invention contemplates that this functionality may be accomplished in numerous ways. For example, a slide hinge 41 is shown. The slide hinge 41 allows the cellular transceiver portion of personal electronic device 2 to slide past the PDA portion of the personal electronic device 2, so that both the cellular transceiver and the PDA are accessible at the same time. This configuration also permits the PDA display or touch screen to be protected when in a closed position. More than one slide hinge may be used, such as a slide hinge on each side of the device as shown. The present invention further contemplates that the PDA buttons 24 need not be accessible such that the cellular portion may completely cover the PDA portion when in a closed position.

Figure 8:
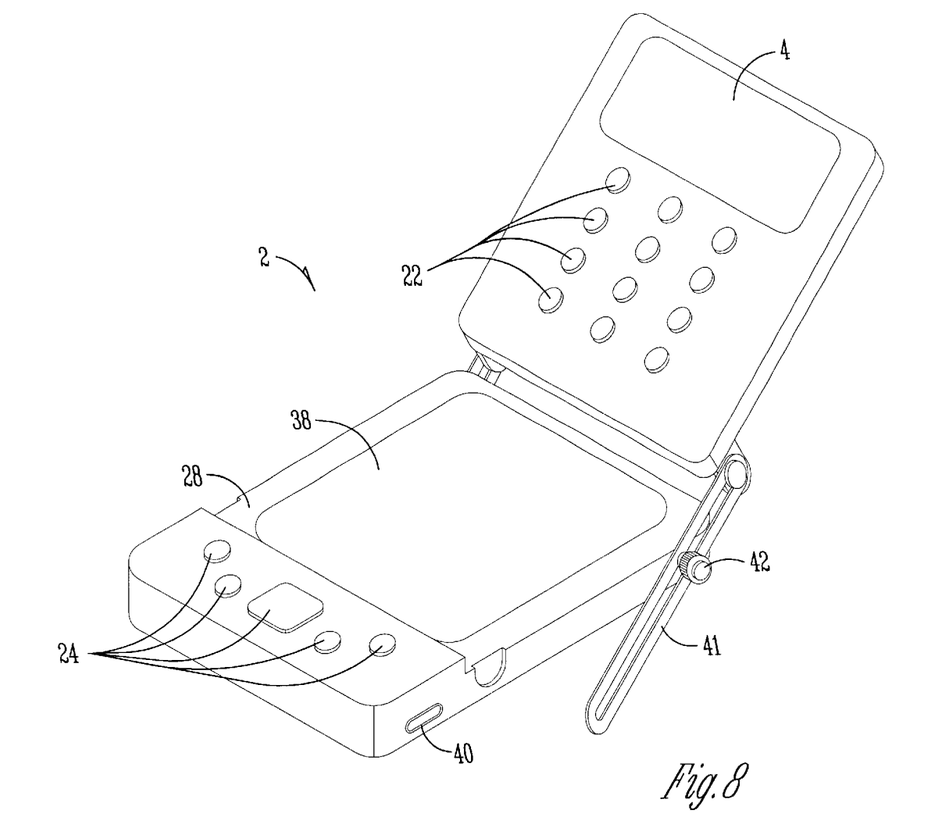
FIG. 8 is a diagram of the personal electronic device with the telephone transceiver portion positioned at an angle relative to the PDA portion.

FIG. 8 shows the personal electronic device 2 with a slide hinge 41. As shown, hinge 41 permits the telephone portion of the personal electronic device to open such that both the telephone key pad buttons 22 and the PDA portion 28 are available at the same time. A knob or button 42 may be used to secure the position of the slide hinge 41. The present invention permits the angle of the telephone portion relative to the PDA portion to be adjusted.

Figure 9:
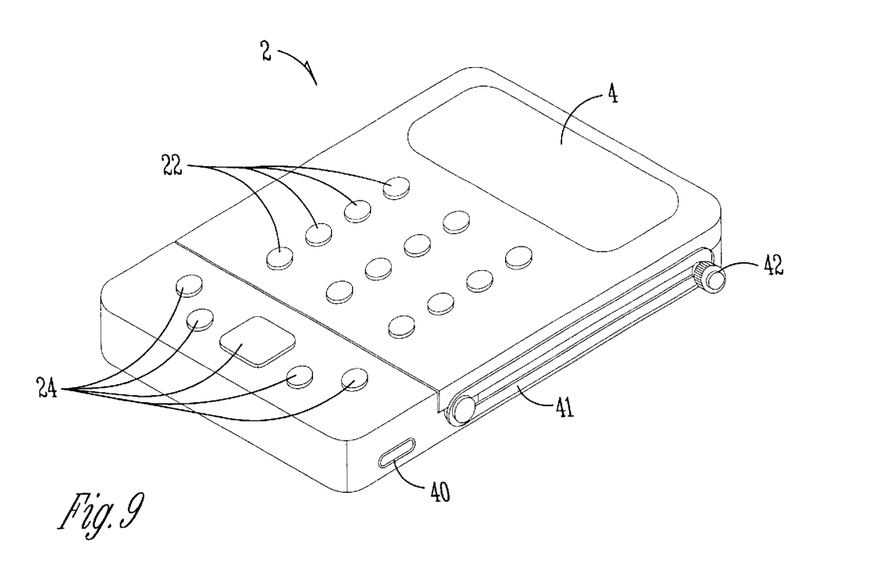
FIG. 9 is a diagram of the personal electronic device in a closed position.

FIG. 9 shows the personal electronic device 2 in a closed position. When in a closed position, the key pad buttons 22 are still available and the display 4 is also viewable. In addition, the PDA buttons 24 are also available as well.

Figure 10:
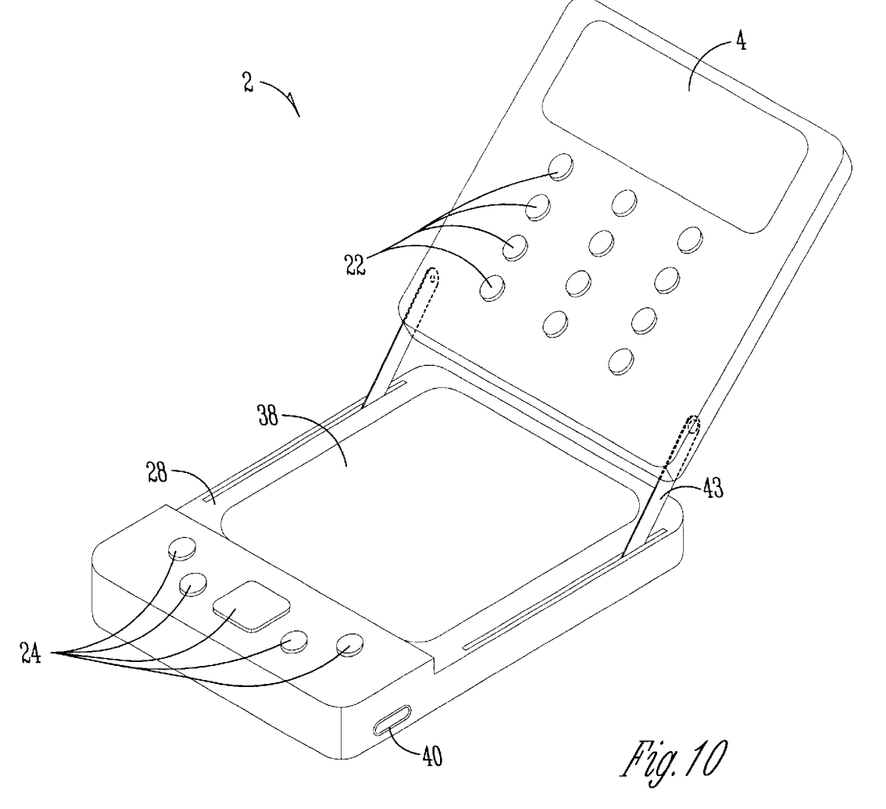
FIG. 10 is a diagram of a hinged embodiment of the personal electronic device in an open position.
Figure 11:
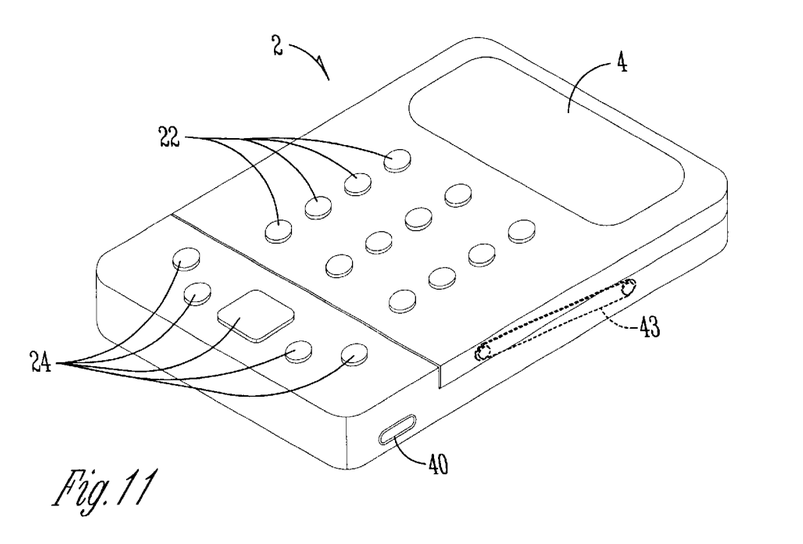
FIG. 11 is a diagram of a hinged embodiment of the personal electronic device in a closed position.

FIGS. 10 and 11 show the personal electronic device 2 with an interiorly mounted slide hinge 43. The present invention contemplates that the angle between the telephone portion and the PDA portion may be adjusted by altering the position of the interiorly mounted slide hinge 43 or pivoting on the pivot points of the interiorly mounted slide hinge 43.

The present invention also contemplates that a lateral hinge may be used. The lateral hinge allows the personal electronic device 2 to be opened in a manner such that both the PDA portion and the cellular telephone keypad portion are accessible at the same time. The present invention also contemplates other variations such as one or more slide hinges, lateral hinges, collapsible hinges, slide joints, lateral joints or similar mechanisms. The present invention also contemplates that a ratchet mechanism may be built into a hinge or otherwise used to open the personal electronic device 2. Using a ratchet mechanism or other device, the personal electronic device is constructed in a manner that permits the personal electronic device 2 to be opened at various angles. For example, the personal electronic device 2 may be opened at a full 180° angle such that both the PDA portion and the cellular portion are flat. In addition, other angles may be used such as 60°, 90°, 120°, 150°. This permits additional flexibility for the user in that an LCD display on the cellular phone portion may be better viewed, keys may be more easily accessed, glare on the PDA's display may be eliminated or reduced, or for other reasons that a particular use or environment may suggest.

It should be readily apparent that the present invention may be implemented in a number of different ways with regards to the specific construction techniques used to allow the device to open in a manner such that both the keypad and the touch screen are accessible when the device is in an open position. As previously discussed, a ratchet wheel can be used with inner teeth for compact assembly or outer teeth. Motorized opening and closing is also facilitated with the motorized operating of the ratchet wheel. When a ratchet mechanism is used there may be multiple pawls placed side by side for finer adjustment of the angle of the keypad portion relative to the touch screen display portion. In addition, a flexible coil can be used, the flexible coil allowing the position of the keypad portion to be adjusted with respect to the touch screen portion. The keypad portion may slide into position. The slide mechanism may be located on the side of the device and may include slots along the side of the device or other implementation. In addition, the device may be configured such that the keypad portion is slidably mounted to the back or interior of the display portion.

Figure 12:
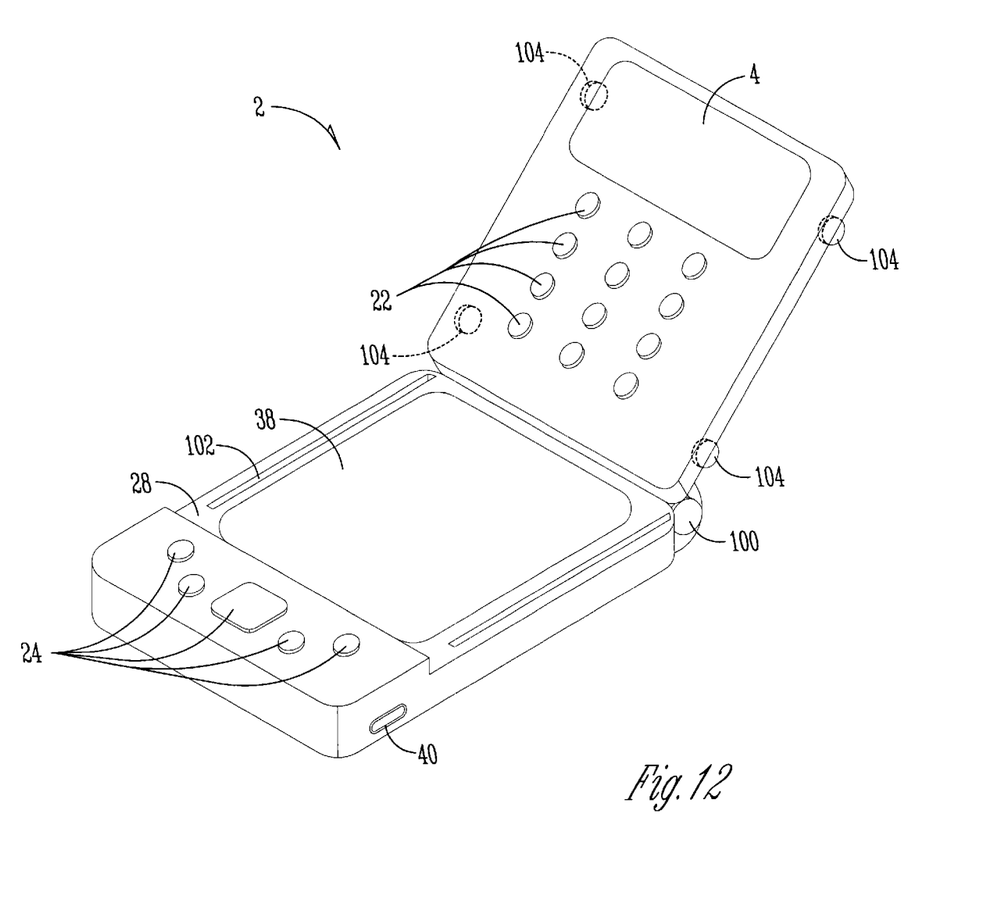
FIG. 12 is a diagram of a personal electronic device according to another embodiment of the invention.

FIG. 12 illustrates another variation of the present invention. In FIG. 12, the personal electronic display 2 is shown. The telephone transceiver portion has a plurality of wheels or rollers 104. These rollers are adapted to fit within the track 102. The present invention contemplates that the track may shallow near the top most portion of the track. The rollers 104 permit the telephone transceiver portion of the personal electronic device 2 to be slidable and/or glidable in order to permit separation from the PDA portion of the personal electronic device 2 in a manner that provides a user with access to both the buttons 22 on the cellular phone portion and the PDA display 38. Motorized function also facilitates these same actions. Once the telephone transceiver portion slides past the PDA portion it may lock in place. The cellular phone portion may lock in place to a spring hinge 100. The spring hinge 100 allows the tilt position of the telephone transceiver portion to be adjusted.

Figure 13:
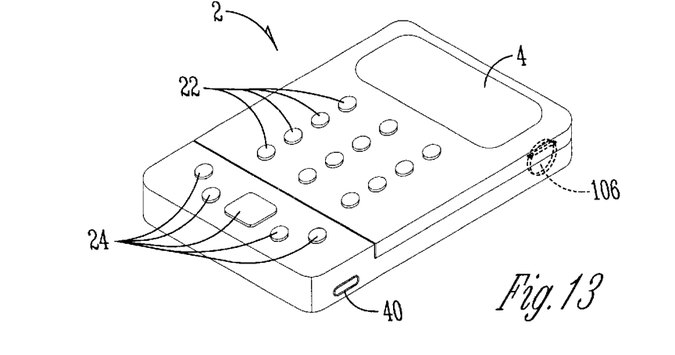
FIG. 13 is a diagram of a slidably mounted personal electronic device of the present invention in closed position.
Figure 14:
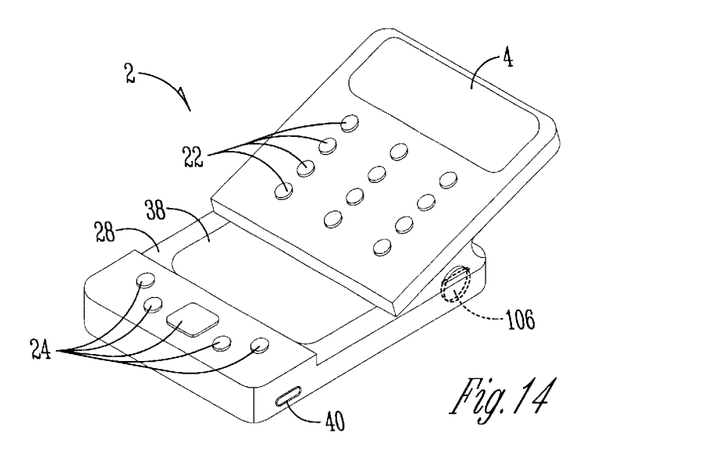
FIG. 14 is a diagram of a slidably mounted personal electronic device of the present invention in a tilted position.
Figure 15:
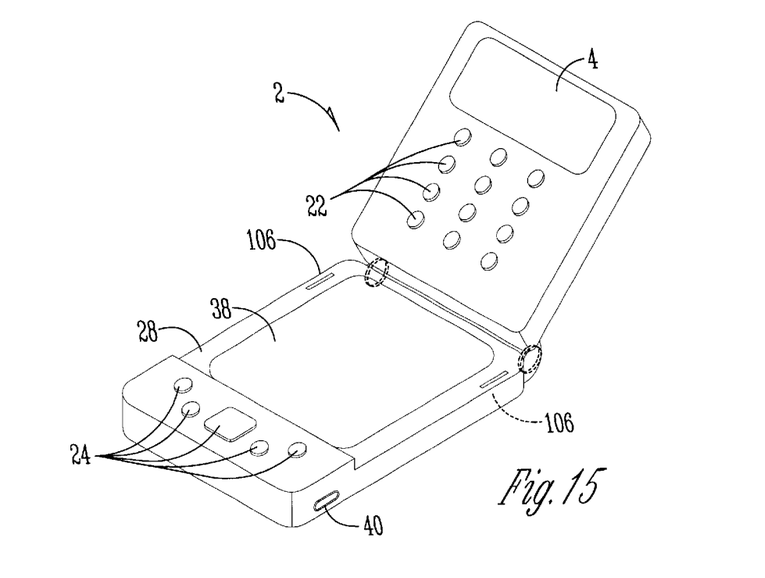
FIG. 15 is a diagram of the personal electronic device of the present invention in another tilted position.

Another variation on the present invention is shown in FIGS. 13 through 15. In FIG. 13 the personal electronic device 2 is shown in a closed position. In FIG. 13 there is an adjustment mechanism 106. In FIG. 14 the telephone transceiver portion is slid through a track slot or other structure in an angled manner. This action is facilitated either manually or through motorized activation, or other forms of electronic actuation. As shown in FIG. 15, once the telephone transceiver portion has been slid past the adjustment mechanism 106, the adjustment mechanism 106 is depressed into the body of the PDA portion. Once the telephone transceiver portion has been slid past the adjustment mechanism 106, the PDA portion may be pivoted to a desirable viewing angle. The present invention contemplates that numerous mechanisms may be used in a similar fashion to permit the telephone transceiver portion to upwardly slide along the PDA portion to a point where it will be adjustable. Electronic actuation, including motorized functionality allow facilitation of the same action.

Figure 16:
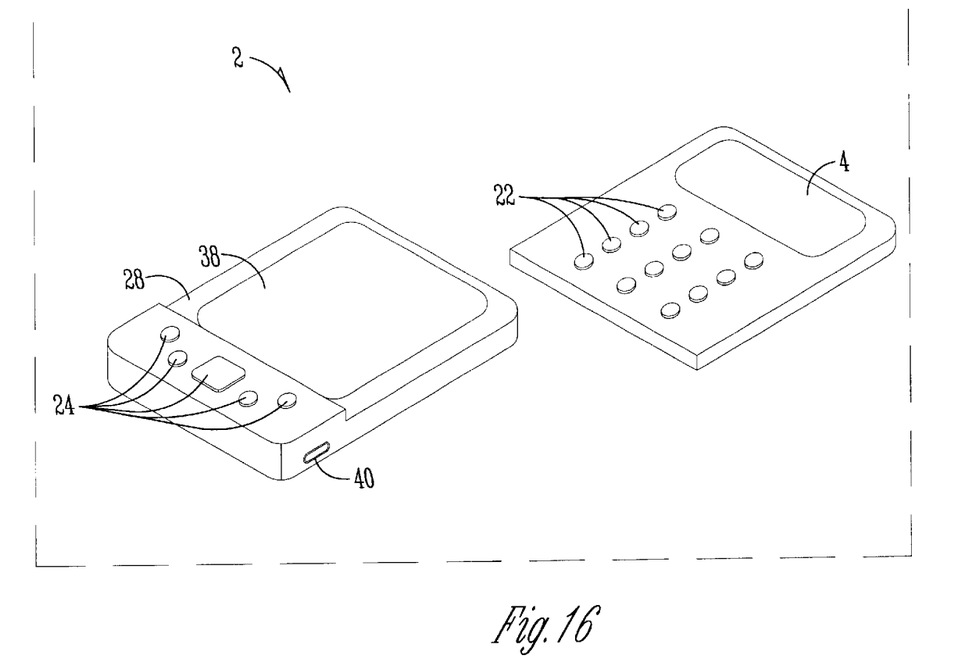
FIG. 16 is a diagram of a removable embodiment of the personal electronic device of the present invention.
Figure 17:
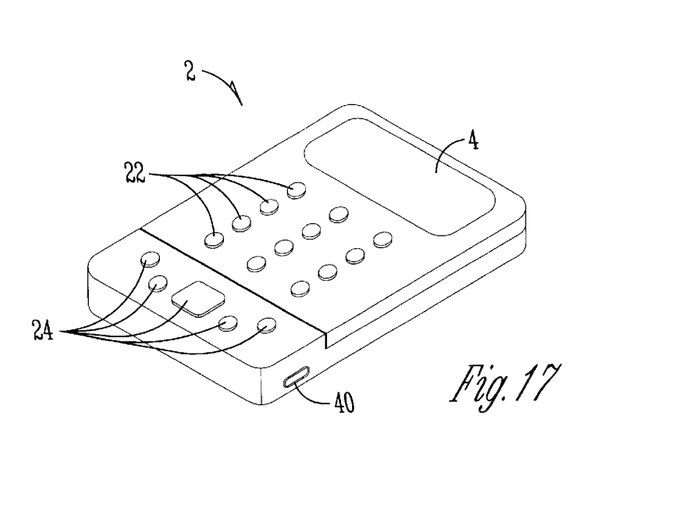
FIG. 17 is a diagram of the removable cellular portion embodiment of the present invention in a docked position.

In FIG. 16, the telephone transceiver portion is removably attached to the PDA portion. The present invention contemplates that the PDA portion and the telephone transceiver portion may communicate wirelessly through any number of wireless protocols and standards. This physical arrangement allows a user to access both the PDA display 38, the PDA buttons 24, the telephone transceiver buttons 22 and the telephone transceiver display for all simultaneously. In FIG. 17, the telephone transceiver portion is fitted onto the PDA portion. The present invention contemplates that the telephone transceiver portion may be locked into place on the PDA portion or otherwise secured in any number of ways. The present invention also contemplates that when in a locked position, the telephone transceiver portion may be in direct electrical connection with the PDA portion to provide for the charging of batteries in the telephone transceiver portion, the exchange of information between telephone transceiver portion and the PDA portion, or for other uses.

Figure 18:
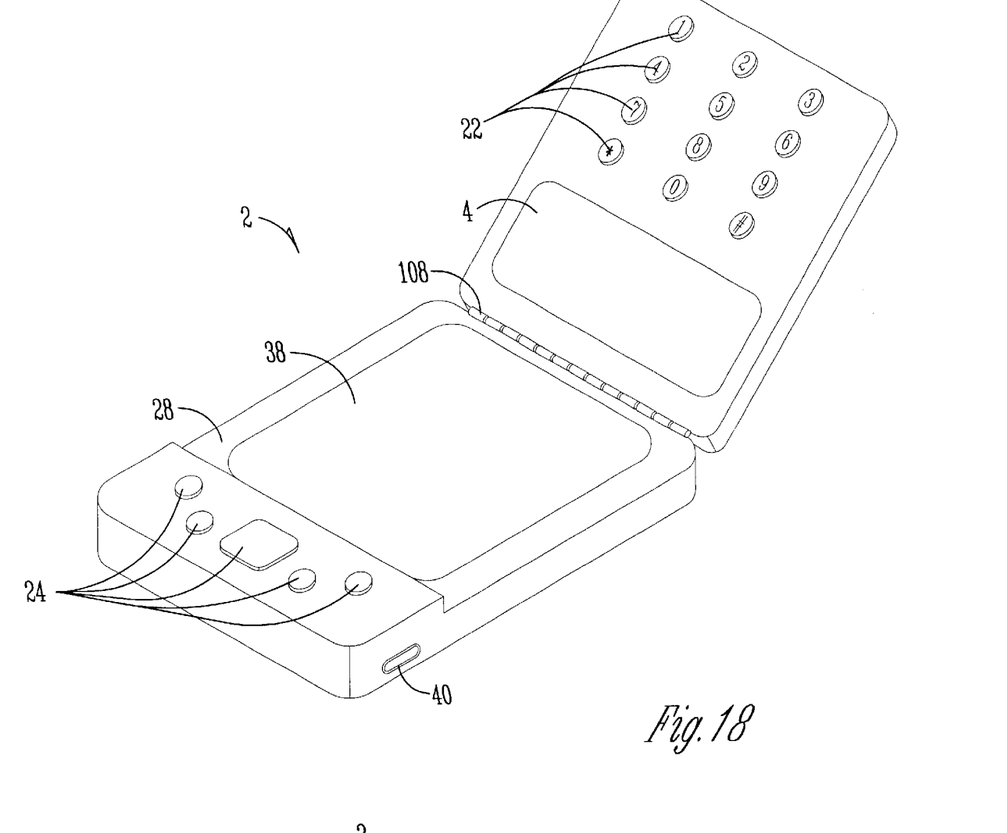
FIG. 18 is a diagram of the personal electronic device of the present invention having a display and buttons accessible on each side of the device.
Figure 19:
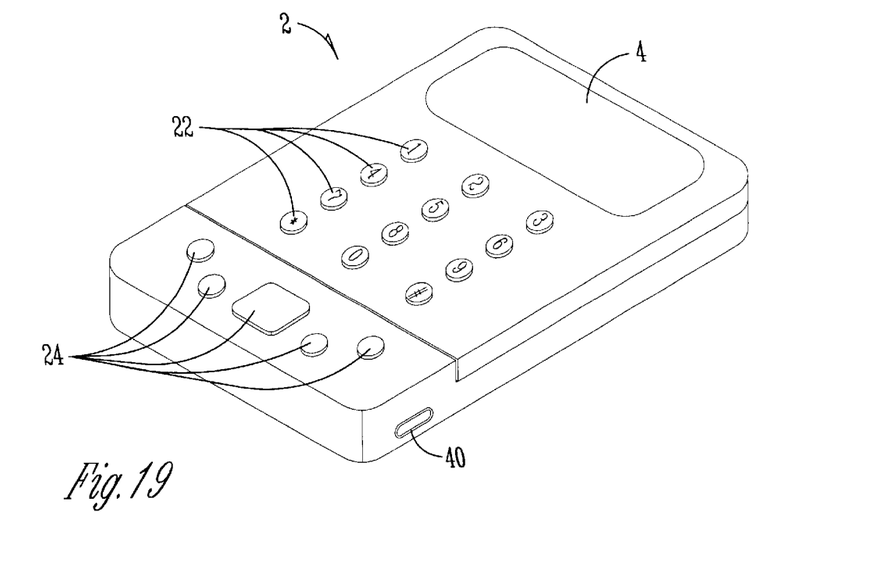
FIG. 19 is a diagram of an embodiment of the present invention having a display in a closed position.

FIGS. 18 and 19 show another variation of the present invention that allow a user simultaneous access to both the PDA portion and the telephone transceiver portion. In FIG. 18, a hinge 108 is used. The hinge 108 is a standard hinge such as may be used in a flip phone or other device. The buttons 22 are accessible from either side of the device. This can be accomplished in multiple ways. For example, two sets of buttons can be used where the buttons share an electrical contact. Alternatively, two sets of buttons can be used, each set of buttons having its own set of contacts. In this variation, the display 4 may be a transparent display. This permits the display to be viewed from either side. It is to be understood that the function of the buttons as well as the display on the screen may need to be reversed or mirrored depending upon the context of the use of the device. For example, when the hinge is in an open position than the display will provide a mirror image of the display image when the personal electronic device 2 is in a closed position. The present invention also contemplates that instead of having a single transparent display, there may be two displays, one on each side of the telephone transceiver portion and both separate and distinct from the PDA display. In addition the present invention contemplates that instead of a display, a see through material such as a plastic material may be used. When in a closed position, a user can see display information through the clear plastic that is displayed on the PDA display 38. When in an open position, the user can also still see PDA display 38. In this manner, the user has access to buttons, both the telephone transceiver portion and the PDA portion at the same time. In addition, the user can always see at least a portion of the PDA display 38 regardless of whether the personal electronic device 2 is in an open position or a closed position if a transparent display is used. Either manual operation or electronic actuation, including motorized functions allow for the opening and closing of the device.

Figure 20:
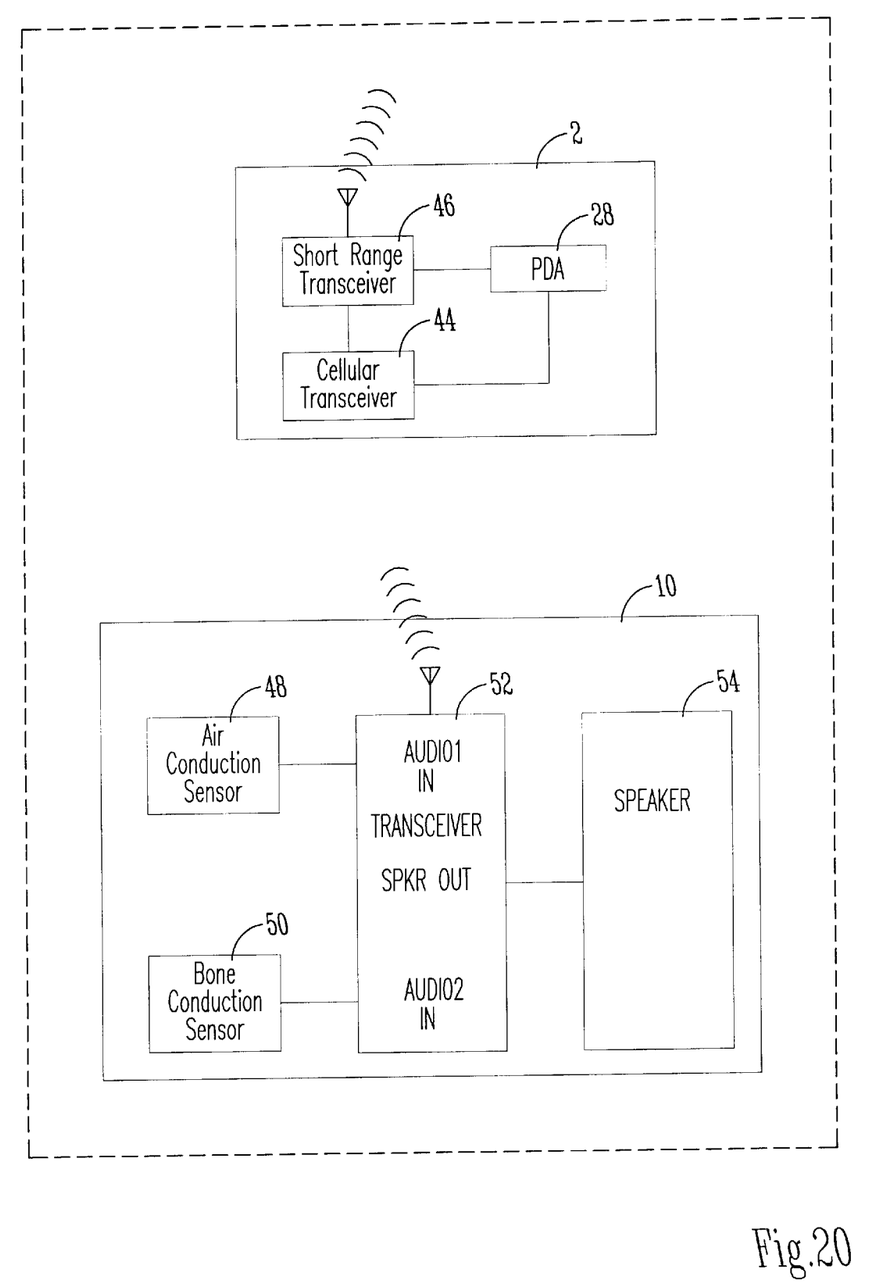
FIG. 20 is a block diagram of the personal electronic device in wireless communication with an earpiece.
Figure 21:
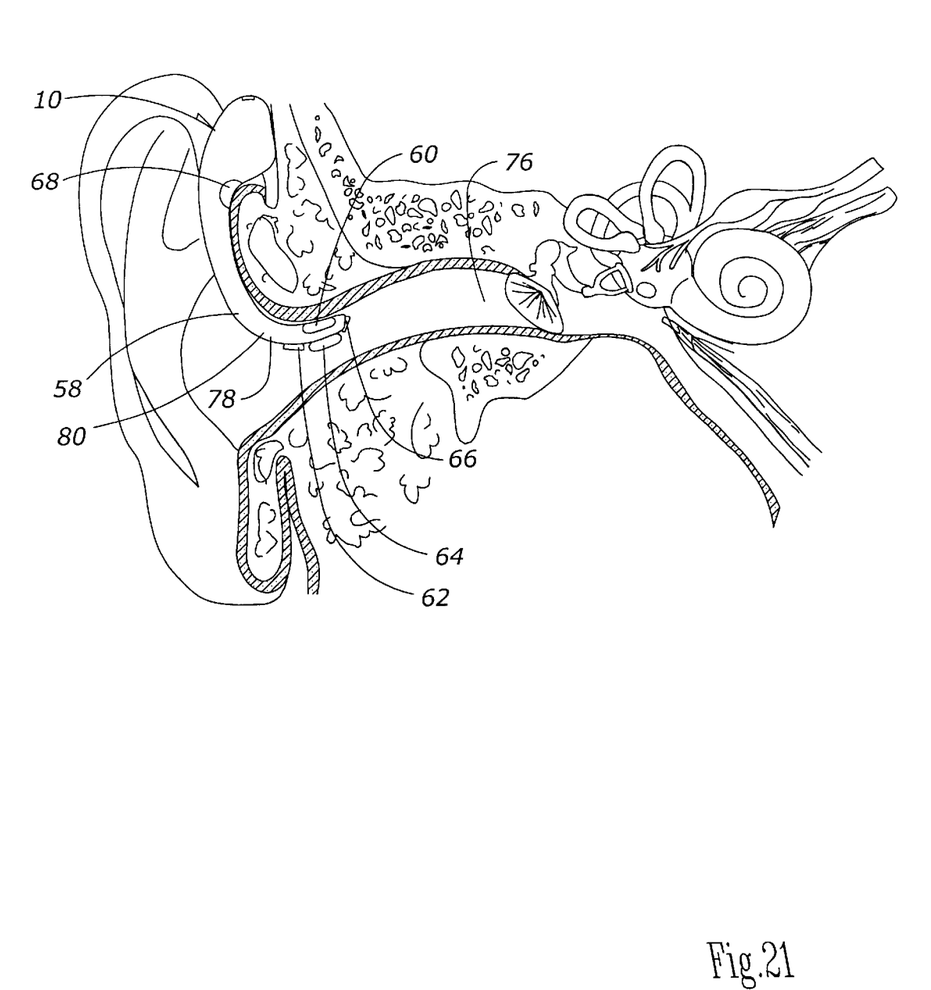
FIG. 21 is a diagram of the earpiece of the present invention fitted within an ear.

FIG. 20 discloses an example of the earpiece 10 of the present invention. The earpiece 10 is designed to be worn at the ear. As shown in FIG. 21, an external canal portion 58 of the earpiece 10 is positioned in the external auditory canal. The external auditory canal portion of the earpiece includes a bone conduction sensor 60 and an air conduction sensor 62 located on a resilient member 78.

The present invention contemplates that the earpiece need not include a speech processor or other processor within the circuit portion 58 of the device. The earpiece need only include a speaker, a bone or air sensor microphone, and transceiver. Use of the earpiece with a bone conduction sensor 60 and an air conduction sensor 62 improves the quality of the sound. Where processing capabilities are not included within the earpiece 10, both a bone conduction sensor and an air conduction sensor can still be used. For example, the transceiver used may be a stereo transceiver. This permits two channels of audio signals to be simultaneously transmitted. The PDA portion of the device may then perform speech processing as required, instead of or in addition to speech processing occurring within the earpiece. By permitting the PDA rather than a portion of the earpiece to perform this processing, the size of the earpiece may be further reduced.

A general description of the present invention as well as a preferred embodiment has been set forth above. Those skilled in the art will recognize and will be able to practice additional variations and the methods and devices described which fall within the teachings of this invention. Accordingly, all such modifications and additions are deemed to be within the scope of the invention which is to be limited only by the claims appended hereto.

What is claimed is:

1. A handheld personal electronic device comprising:
   a first body having a touch screen display; and
   a second body having a plurality of manual inputs, the second body capable the first body, the personal electronic device having an open position wherein the touch screen display of the first body and the manual inputs of the second body are accessibly exposed to face a user the personal electronic device having a closed position wherein the touch screen display of the first body is fully protected by the second body and the manual inputs of the second body are accessibly exposed to face the user;
   wherein the second body travels out and away from and over a top portion of the touch screen display; and
   wherein the first body is adjacent the second body in the open position.

2. The handheld personal electronic device of claim 1 wherein the first body is connected to the second body with a hinge.

3. The handheld personal electronic device of claim 2 wherein the hinge is slidable.

4. The handheld personal electronic device of claim 2 wherein the hinge is collapsible.

5. The handheld personal electronic device of claim 1 wherein the first body is pivotably mounted to the second body.

6. The handheld personal electronic device of claim 1 wherein the first body is slidably mounted to the second body.

7. The handheld personal electronic device of claim 1 wherein the first body is removably attached to the second body.

8. The handheld personal electronic device of claim 1 further comprising electronic actuation means for selecting between the open position and the closed position of the device.

9. The handheld personal electronic device of claim 1 further comprising:
   an electrical interface in the first body;
   a first transceiver operatively connected to the electrical interface; and
   an earpiece, the earpiece having a second transceiver capable of communication with the first transceiver.

10. The handheld personal electronic device of claim 9 wherein the earpiece has a bone conduction sensor.

11. The handheld personal electronic device of claim 9 wherein the earpiece has an air conduction sensor.

12. A handheld personal electronic device comprising:
- a first body having a display, the display having a top portion;
- a second body having a plurality of buttons; and
- a hinge connecting the first body and the second body, having a first position wherein the second body at least partial covers the first body to protect the display while the plurality of buttons are accessible and exposed to face a user and a second position wherein the display is accessible and the plurality of buttons are accessibly exposed to face the user;
- the hinge adapted for transitioning between the first position and the second position such that the second body travels out and away from and over the top portion of the display; and
- wherein the first body is adjacent the second body in the second position.

13. The handheld personal electronic device of claim 12 wherein the hinge is selected from the set including a lateral hinge, a spring-loaded mechanism, a slide hinge, a collapsible hinge, a slide joint, a lateral joint, a flexible coil, and a ratcheting mechanism.

14. The handheld personal electronic device of claim 12 further comprising a release button, in operative connection with the hinge, the release button when activated causing the personal electronic device to move from the first position to the second position.

15. The handheld personal electronic device of claim 14 wherein the release button is located on the hinge.

16. The handheld personal electronic device of claim 14 further comprising a second hinge connecting the first body and the second body.

17. The handheld personal electronic device of claim 12 wherein the display is a touch screen.

18. The handheld personal electronic device of claim 12 wherein the plurality of buttons includes a 12-key telephone keypad.

19. The handheld personal electronic device of claim 12 wherein the first body is a personal digital assistant and the second body is a telephone transceiver.

20. The handheld personal electronic device of claim 12 further comprising a transceiver electrically connected to the first body.

21. The handheld personal electronic device of claim 12 further comprising electronic actuation means for selecting between the open position and the closed position of the device.

22. A hand held personal electronic device, comprising:
- a first body having a display and a first plurality of buttons;
- a second body having a second plurality of buttons; and
- a hinge connecting the first body and the second body, having a first position wherein the second body at least partially covers the first body to protect the display and the first plurality of buttons and the second plurality of buttons are accessibly exposed to face the user and a second position wherein the display is fully accessible and the first plurality of buttons and the second plurality of buttons are accessible and face the user; and
- wherein the second body travels out and away from and over the top most portion of the display; and
- wherein the first body is adjacent the second body in the second position.

23. The hand held personal electronic device of claim 22 wherein the hinge connects the first body and the second body such that the second body passes upwardly over the first body in transitioning from the first position to the second position.

24. The handheld personal electronic device of claim 22 wherein the second body includes a second display and the second body frilly covers the first body in the first position.

25. The handheld electronic device of claim 24 wherein the second display is a transparent display.

26. A handheld personal electronic device, comprising:
- a first body having a display with a top and a bottom;
- a second body having a plurality of buttons; and
- a hinge connecting the first body and the second body, having a first position wherein the second body at least partially covers the first body to protect the display while the plurality of buttons face a user and a second position wherein the display and the plurality of buttons face the user;
- the hinge adapted for transitioning between the first position and the second position such that the second body travels out and away from and over the top of the display; and
- wherein the first body is adjacent the second body in the second position.

27. The communication system of claim 22 further comprising a short range transceiver disposed within said first or second body.

28. The communication system of claim 22 further comprising an ear piece in wireless communication with said short range transceiver, the ear piece having at least one sensor and a speaker, the at least one sensor being adapted for placement within an external auditory canal of a user.

29. The communication system of claim 22 wherein at least a portion of the first body is transparent such that at least a portion of the touch screen display is viewable in the closed position.

30. A handheld communications device, comprising:
- a first body;
- a second body operatively connected to the first body;
- a cellular phone portion having a cellular transceiver, the cellular phone portion having a key pad attached to the first body;
- a personal digital assistant portion having a touch screen display attached to the second body;
- the first body and the second body having a first position wherein the display is partially protected by the first body and the key pad is accessible;
- the first body and the second body having a second position wherein the display is fully accessible; and
- a close range transceiver disposed in at least one of the first body and the second body for sending and receiving voice communications;
- wherein the first body travels out and away from and over a top portion of the display and wherein the first body is adjacent the second body in the second position.

31. The device of claim 30 further comprising a plurality of buttons positioned on the second body.

32. The device of claim 30 wherein the plurality of buttons are accessible in both the first position and the second position.

33. The communication system of claim 30 wherein the first body is operatively connected to the second body with at least one hinge.

34. A voice communication system, comprising:
a first body, at least a portion of the first body being transparent;
a second body operatively connected to the first body;
a cellular phone portion, the cellular phone portion having a key pad attached to the first body;
a personal digital assistant portion having a touch screen display attached to the second body;
the first body and the second body having a first position wherein the display is at least partially protected by the first body and the key pad is accessible;
the first body and the second body having a second position wherein the display is fully accessible;
a short range transceiver disposed in at least one of the first body and the second body for sending and receiving voice communications;
an ear piece for operative communication with the handheld device, the ear piece having at least one sensor for sensing voice sound information;
a speaker; and
a second short range transceiver disposed within the ear piece and operatively connected to at least one sensor and the speaker.

35. The device of claim 34 further comprising a plurality of buttons positioned on the second body.

36. The device of claim 35 wherein the plurality of buttons are accessible in both the first position and the second position.

37. The device of claim 34 wherein the ear piece is adapted to fit a user such that any portion of the ear piece extending into the external auditory canal of the user does not block the canal.

38. The device of claim 34 wherein the at least one sensor includes a bone conduction sensor.

39. The device of claim 34 wherein the at least one sensor includes both an air conduction sensor and a bond conduction sensor.

40. The device of claim 34 wherein the ear piece includes a processor operatively connected to the short range transceiver.

41. A hand held communications device, comprising:
a first body, at least a portion of the first body being transparent;
a second body operatively connected to the first body along a top edge of the first body and the second body;
a cellular phone portion, the cellular phone disposed within at least one of said first body and second body;
a personal digital assistant portion having a touch screen display attached to the second body;
the first and second body having a first position wherein the display is fully protected by the first body;
the first and second body having a second position wherein the display is fully accessible and facing a user;
a plurality of buttons positioned on the second body that are accessible in both the first position and the second position;
wherein the first body travels out and away from and over a top portion of the display and wherein the first body is adjacent the second body in the second position.

42. The device of claim 41 further comprising a short range transceiver disposed in at least one of the first body and the second body for sending and receiving voice communications.

43. A voice communication system, comprising:
a first body, at least a portion of the first body being transparent;
a second body operatively connected to the first body along a top edge of the first body and the second body;
a cellular phone portion, the cellular phone disposed within at least one of said first body and second body;
a personal digital assistant portion having a touch screen display attached to the second body;
the first and second body having a first position wherein the display is fully protected by the first body;
the first and second body having a second position wherein the display is fully accessible;
a plurality of buttons positioned on the second body that are accessible in both the first position and the second position;
a short range transceiver disposed in at least one of the first body and the second body for sending and receiving voice communications;
an ear piece for operative communication with the handheld device, the ear piece having at least one sensor for sensing voice sound information;
a speaker; and
a short range transceiver operatively connected to the at least one sensor and the speaker.

44. The device of claim 43 wherein the ear piece is adapted to fit a user such that any portion of the ear piece extending into the external auditory canal of the user does not block the canal.

45. The device of claim 43 wherein the at least one sensor includes a bone conduction sensor.

46. The device of claim 43 wherein the at least one sensor includes both an air conduction sensor and a bone conduction sensor.

47. The device of claim 43 wherein the ear piece includes a processor operatively connected to the short range transceiver.

48. A handheld communication device comprising:
a first body, at least a portion of the first body being transparent;
a second body operatively connected to the first body proximate the top edge of the first body and the second body;
at least one of the first body and the second body housing electronics for performing PDA functions and for performing wireless voice communication functions;
a touch screen display having a top and attached to the second body;
the first and second body having a first position wherein the display is fully protected by the first body;
the first and second body having a second position wherein the display is accessible;
a plurality of buttons associated with the second body that are accessible in both the first position and the second position;
the first body being operatively connected to the second body such that the first body travels out and away from and over the top of the display in transitioning from the first position to the second position.

49. The handheld communication of claim 48 wherein the plurality of buttons includes at least five buttons.

50. The handheld communication device of claim 48 further comprising a short range transceiver housed within at least one of the first body and the second body for short range communications with an earpiece.

* * * * *

UNITED STATES PATENT AND TRADEMARK OFFICE
CERTIFICATE OF CORRECTION

PATENT NO. : 6,542,721 B2
DATED : April 1, 2003
INVENTOR(S) : Peter V. Boesen It is certified that error appears in the above-identified patent and that said Letters Patent is hereby corrected as shown below:

Column 8,
Line 28, after "capable" insert -- of attachment to --.

Signed and Sealed this

Fourteenth Day of October, 2003

JAMES E. ROGAN
*Director of the United States Patent and Trademark Office*